July 23, 1940.
C. L. CARSTEN
2,209,098
RECIPROCABLE VEHICLE
Filed Nov. 25, 1938
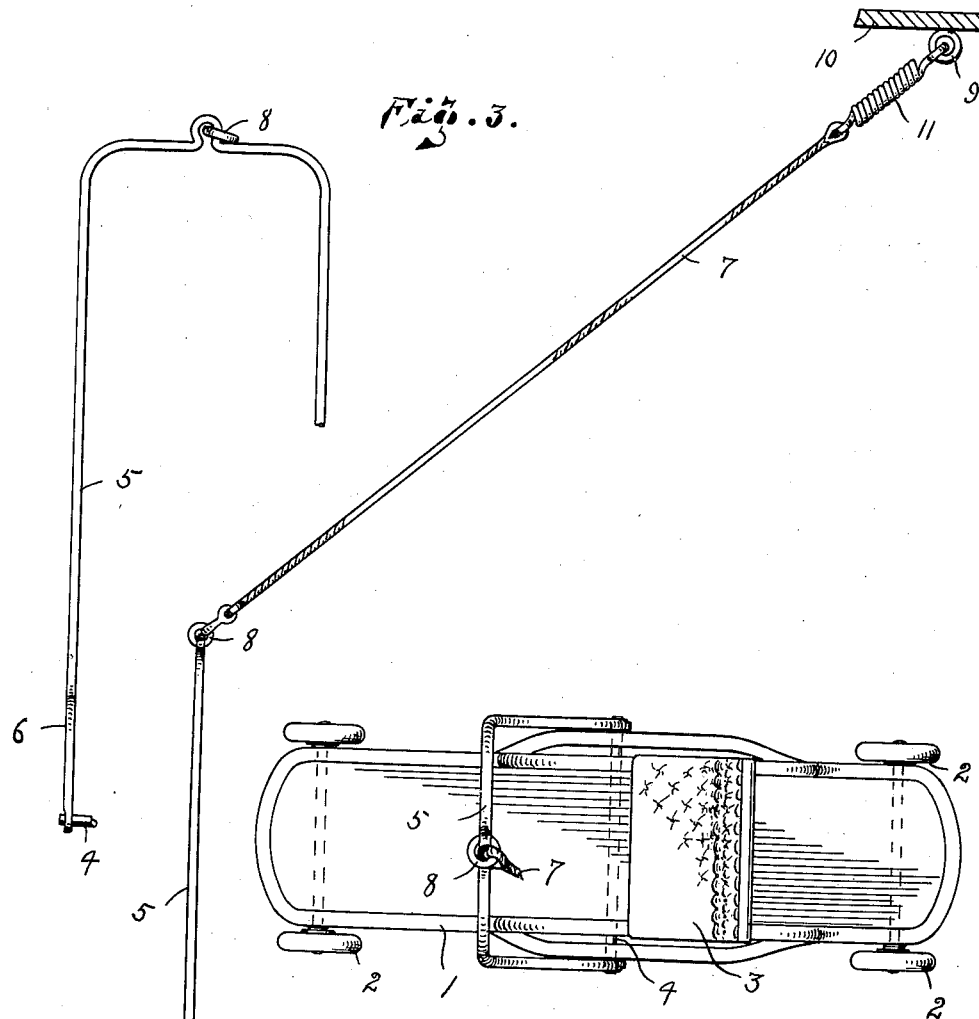
INVENTOR.
Christian L. Carsten.
BY Geo. Stevens.
ATTORNEY.

Patented July 23, 1940

2,209,098

UNITED STATES PATENT OFFICE 2,209,098

RECIPROCABLE VEHICLE

Christian L. Carsten, Duluth, Minn.

Application November 25, 1938, Serial No. 242,219

2 Claims. (Cl. 272—79)

This invention relates to tethered vehicles and has special reference to such a device adapted for use as an exercising mechanism, or for amusement purposes.

The principal object is that of providing a simple means for back and forth movement of a vehicle while carrying an operator, and during the functioning of which the operator's entire body is more or less active.

Another object is that of providing such a device having novelty in the way of amusement for children.

Other objects and advantages of the invention will appear in the following description thereof.

Referring now to the accompanying drawing, forming part of this application, and wherein like reference characters indicate like parts:

Figure 1 is a side elevation of one embodiment of the invention.

Figure 2 is a top plan view of the vehicle portion of the invention.

Figure 3 is an elevation at right angles to that shown in Figure 1 of the bale or operating lever of the vehicle.

In the drawing, 1 represents the chassis of any suitable form of vehicle for the purpose, it being illustrated as mounted upon four wheels indicated at 2 and designed only for back and forth, or reciprocal, movement. This vehicle I have illustrated as having an elevated adjustable seat 3 such as suitable for use by children as an amusement device, and which, obviously, may be of any desired construction. Just below the seat and approximately centrally of the vehicle, as upon the transverse shaft 4 is pivotally mounted the inverted U-shaped operating lever 5, and especially for the convenience of children in the operation of same, the lower termini of this operating lever is arched forwardly as at 6, away from the seat 3, and is also shown as being attached to the shaft 4 outwardly from the sides of the vehicle to lessen as much as possible the danger of accident as by pinching or cramping a child attempting the operation of same, or getting on or off the seat of the vehicle. Furthermore this location of the operating lever is found to be ideal both for access by the operator as well as proper balance in the operation of the vehicle.

The operating lever 5 is relatively of considerable height so as to be sufficiently long to clear the entire vehicle when in its extreme position in either direction, and furthermore the approximate height shown has proven ideal for use in an ordinary home, where the flexible tether 7, attached in any desired manner to the uppermost extremity of the lever 5 as at 8, is attached, as at 9, at its opposite end to the ceiling illustrated at 10.

It is apparent that these proportions of the attaching elements to the vehicle would vary as for example in a gymnasium or the like where the device is used particularly for exercise or physical development of the operator.

Intermediate of the upper end of the tether 7 and its attachment 9 to the ceiling is installed a contractile helical spring 11, the principal object of which is to prevent sudden stopping of the vehicle at the end of its travel in either direction as well as to assist in the initial motion of the vehicle in the opposite direction. It is apparent that this spring or resilient portion of the tether may be installed at either end thereof with similar results, and that the entire tether may be resilient, as for example be wholly of rubber or spring.

As the action of the device during operation may be somewhat obscure, it may be well to state that as an operator sits upon the seat of the vehicle when in the position shown, and reaches forwardly, grasping the lever 5 just in front of him and pushes on same, the pull of the tether on the spring will cause it to yield slightly simultaneously with exerting a tendency to force the vehicle backwardly and if this is quickly done, the vehicle will naturally assume a position just the reverse of that shown in the drawing, that is to the opposite side of the point of attachment in the ceiling, then when the operator pulls upwardly and towards him the lever 5, the vehicle will again be impelled to the position here shown, the spring 11 of course functioning to assist the stress on the vehicle in the opposite direction as previously described. It is found in practice when these stresses of push and pull are properly applied in respect to the motion of the vehicle, very quick and interesting back and forth motion of the vehicle with the operator thereupon is accomplished, and this is very interesting not only to the operator but to spectators as well.

Having thus described my invention, what I claim and desire to secure by Letters Patent, is:

1. Traction means for a horizontally reciprocal vehicle comprising an upright yoke member pivotally attached at its lower free ends to the sides of said vehicle intermediate of its ends for engagement by an operator upon said vehicle, and a contractile yieldable tether extending from the upper central portion of said upright yoke member to a fixed object materially above said vehicle whereby alternate push and pull stress upon said upright by an operator on the vehicle will propel the latter back and forth.

2. In an amusement device of the type described, the combination with a vehicle for carrying an operator, of an upright yoke member pivotally attached at its lower ends to said vehicle intermediate of its ends and rockable by the operator for propelling the vehicle, and resilient means attached at one end to the uppermost terminus of said upright yoke member and at the other end to a fixed object above said vehicle.

CHRISTIAN L. CARSTEN.